(12) United States Patent
Hiramatsu et al.

(10) Patent No.: US 8,734,538 B2
(45) Date of Patent: May 27, 2014

(54) PREPARATION PROCESS OF ELECTRODE FOR BATTERY

(75) Inventors: Kenta Hiramatsu, Kyoto (JP); Masakazu Sanada, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 81 days.

(21) Appl. No.: 13/572,297

(22) Filed: Aug. 10, 2012

(65) Prior Publication Data

US 2013/0047430 A1   Feb. 28, 2013

(30) Foreign Application Priority Data

Aug. 23, 2011   (JP) ................. 2011-182063

(51) Int. Cl.
  *H01M 4/82*   (2006.01)
  *H01M 6/00*   (2006.01)
(52) U.S. Cl.
  USPC ................ 29/623.1; 29/623.5; 29/874
(58) Field of Classification Search
  USPC .............. 29/623.1, 623.5, 829, 874; 429/162, 429/233
  See application file for complete search history.

(56) References Cited

U.S. PATENT DOCUMENTS

| 2003/0114297 A1* | 6/2003 | Shinn et al. | 502/159 |
| 2006/0043892 A1* | 3/2006 | Yabe et al. | 313/582 |
| 2011/0070479 A1 | 3/2011 | Matsuda et al. | |

FOREIGN PATENT DOCUMENTS

| JP | 2008-243735 | 10/2008 |
| JP | 2011-70788 | 4/2011 |

OTHER PUBLICATIONS

Partial English translation of the Office Action is based on the Japanese translation of the Korean Office Action dated Mar. 27, 2014 for corresponding Korean Application No. 10-2012-0087746.
Japanese translation of the Korean Office Action dated Mar. 27, 2014 for corresponding Korean Application No. 10-2012-0087746.
Korean Office Action dated Mar. 27, 2014 for corresponding Korean Application No. 10-2012-0087746.

* cited by examiner

*Primary Examiner* — Thiem Phan
(74) *Attorney, Agent, or Firm* — Ostrolenk Faber LLP

(57) ABSTRACT

Preparation process of electrode for battery, comprising first application step for forming first linear part by relatively moving first nozzle which discharges first active material linearly with respect to current collector to form a plural of first linear parts on current collector, first drying step for drying first linear parts, second application step for forming second linear part between first linear parts by relatively moving second nozzle which discharges second active material with respect to current collector, and second drying step for drying first linear part and second linear part, wherein height $H_1$ of first linear part and height $H_2$ of second linear part satisfies the relational inequality (1): $H_1 < H_2$. The active material layer has high aspect ratio, and gives lithium ion secondary battery excellent in high charge-discharge performance.

5 Claims, 5 Drawing Sheets

PREPARATION PROCESS OF ELECTRODE FOR BATTERY

BACKGROUND OF THE INVENTION

1. Field of the Invention

The present invention relates to a process for preparing an electrode for battery such as a lithium ion secondary battery.

2. Description of the Related Art

Lithium ion secondary batteries are composed of a positive electrode, negative electrode, an electrolyte and a separator etc. have a light weight, a large capacity and high charge-discharge performance, and are widely used in fields of mobile devices such as laptop computer and cellular phone and field of automobiles. Various studies have been done for establishing larger capacity and higher charge-discharge performance.

The rate determining factor to enlarge the capacity and to enhance the charge-discharge performance is a rate of reaction of an electrolyte with a positive electrode active material contained in the positive electrode and a negative electrode active material contained in the negative electrode. However, because a lithium ion conductivity of the electrolyte is low, it is important to make a distance between the positive electrode and the negative electrode shorter, and to increase areas of the positive and negative electrodes as large as possible, especially to enlarge contact areas of the electrolyte with the positive and negative electrode active materials.

Considering this viewpoint, for example, Patent Document 1 (JP2011-70788 A) proposes, in order to present an all-solid battery to achieve low cost, high safety, high energy density-high performance, a process for preparing an all-solid battery which includes three-dimensional electrodes containing active materials of concavo-convex structure.

Namely, in Patent Document 1 (Claim 1, etc.), there is proposed a process for preparing an all-solid battery which includes a first active material layer forming step by forming the first active material layer having a given concavo-convex pattern by applying a coating liquid containing a first active material to a substrate, after the first active material layer forming step, an electrolyte layer forming step by applying a coating liquid containing a polymer electrolyte on the integrated substrate in which the first active material layer is integrated on the surface of the substrate to form an electrolyte layer having convexity and concavity almost along with the concavo-convex pattern on the integrated substrate, and, after the electrolyte layer forming step, a second active material layer forming step by applying a coating liquid containing a second active material to the surface of the electrolyte layer to form a second active material layer having an almost flat surface on the opposite side to the side which contacts with the electrolyte layer.

In the above technique proposed in the Patent Document 1, however, in order to increase a capacity of the tree-dimensional electrode, when forming the first active material layer having concavo-convex pattern, it is necessary to form an active material layer having a pattern with a high aspect ratio, and to decrease a gap between the pattern.

Though there is an approach that a solid content of a slurry-like active material is made high, productivity becomes worse. When using a usual active material having a relatively low solid content, there are problems that the injected active material for forming neighboring convex parts causes liquid bleeding, or that the neighboring convex parts are brought into contact with each other. Therefore, any active material layer having a patter with a high aspect ratio cannot be obtained.

Considering the aforementioned problems, the object of the present invention is to provide a technique of a process for preparing an electrode for battery such as a lithium ion secondary battery being excellent in high charge-discharge performance by forming an active material layer having a high aspect ratio through simple process steps.

SUMMARY OF THE INVENTION

The present invention relates to a process for preparing an electrode for battery, comprising a first application step for forming a first linear part by relatively moving a first nozzle which discharges a first active material linearly with respect to a current collector to form a plural of first linear parts on the current collector, a first drying step for drying the first linear parts, a second application step for forming a second linear part between the first linear parts by relatively moving a second nozzle which discharges a second active material with respect to the current collector, and a second drying step for drying the first linear part and the second linear part, wherein a height $H_1$ of the first linear part and a height $H_2$ of the second linear part satisfies the following relational inequality (1): $H_1 < H_2$.

According to the process for preparing the electrode for battery of the present invention having such a construction, since the second linear part of the second active material is formed between a plural of the first linear parts of the first active material in such a manner that the second linear part is higher than the first linear part, and a part of the second active material can be absorbed by the first linear parts, the problem of liquid bleeding cannot be happened. Therefore, an active material layer having a high aspect ratio can be certainly formed without impairing the shape and size of the active material pattern, and thus, an electrode for battery such as a lithium ion secondary battery being excellent in high charge-discharge performance can be certainly obtained. In addition, since the first linear part is lower in height and electrical conductivity than the second linear part, it is possible, for instance, to decrease an amount of an electrically conductive aid than that of the second linear part and to increase an amount of the active material, whereby a capacity can be enhanced while maintaining its charge-discharge performance.

According to the process for preparing the electrode for battery of the present invention, it is preferable that the first active material and the second active material are the same.

The compositions of the first active material and the second active material may be the same or different, and can be optionally selected according to the desired capacity and charge-discharge performance of the battery. When the first active material and the second active material are the same, since the first linear part and the second linear part can be prepared by the single active material, an electrode for battery such as a lithium ion secondary battery being excellent in high charge-discharge performance can be certainly obtained.

According to the process for preparing the electrode for battery of the present invention, it is preferable that a width $W_1$ of the first linear part and a width $W_2$ of the second linear part satisfies the following relational inequality (2): $W_1 \leq W_2$.

According to the present invention having such a construction, since the first linear part is finer than the second linear part, an amount of the second active material to be applied is increased to enlarge a surface area of the second linear part. As a result, an active material layer having a high aspect ratio can be certainly formed without impairing the shape and size of the active material pattern, and thus, an electrode for battery such as a lithium ion secondary battery being excellent in high charge-discharge performance can be certainly obtained.

According to the process for preparing the electrode for battery of the present invention, it is preferable that the height $H_1$ is less than 100 μm and the height $H_2$ is less than 200 μm.

According to the present invention having such a construction, since electrical resistances of the first linear part and the second linear part are hard to be higher, there is a merit that the charge-discharge performance does not become worse.

According to the process for preparing the electrode for battery of the present invention, it is preferable that the width $W_1$ is less than 100 μm and the width $W_2$ is less than 200 μm.

According to the present invention having such a construction, since such heights can be gained with respect to the widths of the first linear part and the second linear part, there is a merit that a high aspect ratio can be achieved more certainly.

According to the present invention, there is to provide a technique of a process for preparing an electrode for battery such as a lithium ion secondary battery being excellent in high charge-discharge performance by forming an active material layer having a high aspect ratio through simple process steps.

DETAILED DESCRIPTION OF THE INVENTION

In the following, embodiments according to the preparation process of the all-solid battery of the present invention are explained by referring drawings. In the following explanation, the same symbol designates the same or corresponding part, and in some cases, overlapped explanation may be omitted. With respect to the drawings, since drawing is used for explaining the concept of the present invention and for assisting understanding, there is a case that the illustrated size, ratio or number is overdrawn or simplified.

Figure 1:
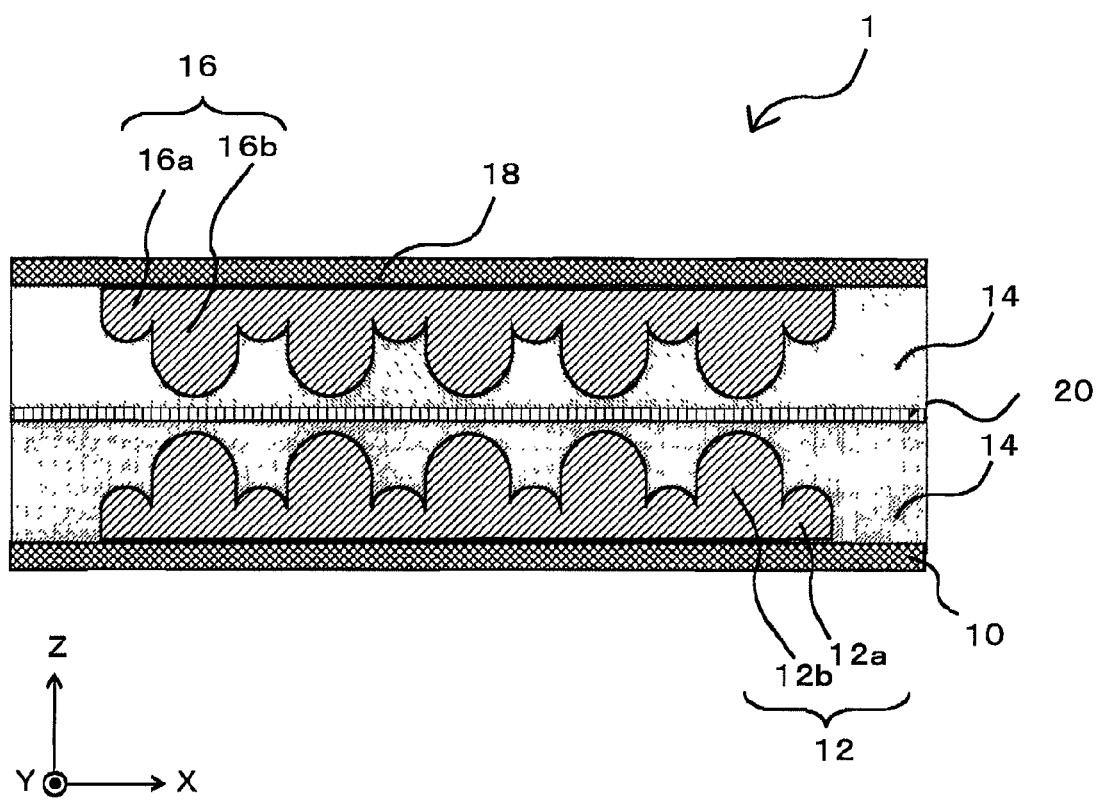
FIG. 1 is a schematic vertical sectional view showing a lithium ion secondary battery produced according to an embodiment of the present invention.

The present invention is explained according to an embodiment where a lithium ion secondary battery shown in FIG. 1 is prepared. FIG. 1 is a schematic vertical sectional view showing a lithium ion secondary battery 1 produced according to this embodiment of the present invention. And FIG. 2 is a schematic vertical sectional view showing a structure (i.e. a structure including the negative electrode current collector 10 and the first linear part 12a made of a negative electrode active material formed on the surface of the negative electrode current collector 10) 20 at that time when the first linear part 12a made of the first negative electrode active material is formed on the surface of the negative electrode current collector 10.

Figure 2:
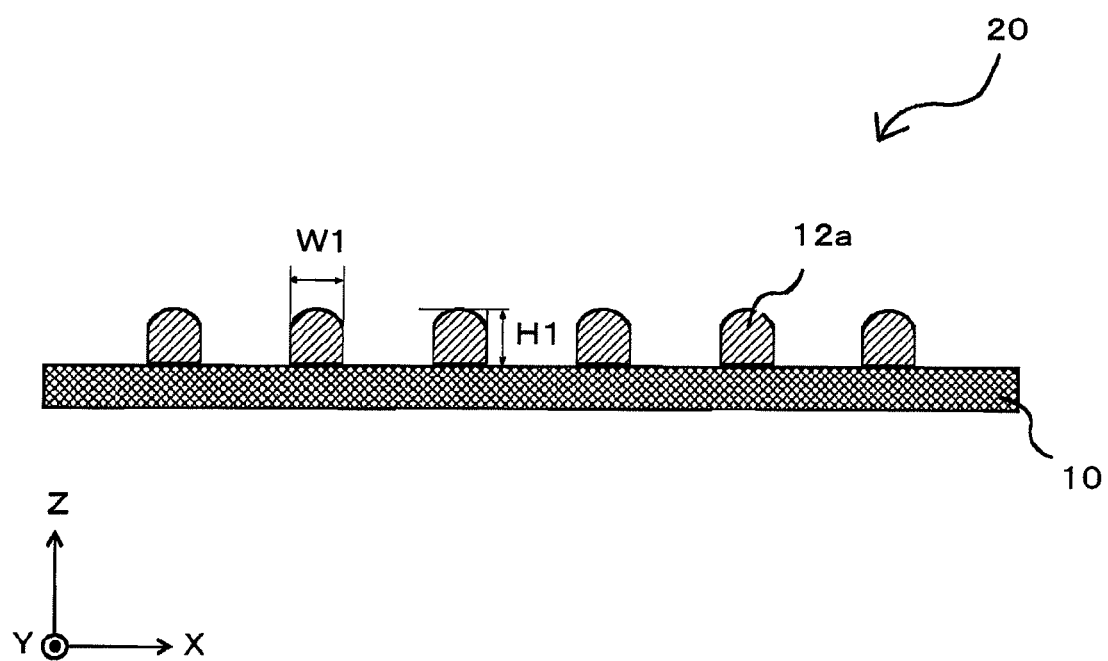
FIG. 2 is a schematic vertical sectional view showing a structure (negative electrode) 20 where a plural of first linear parts 12a made of the first negative electrode active material are formed on the surface of the negative electrode current collector 10 according to an embodiment of the present invention.
Figure 3:
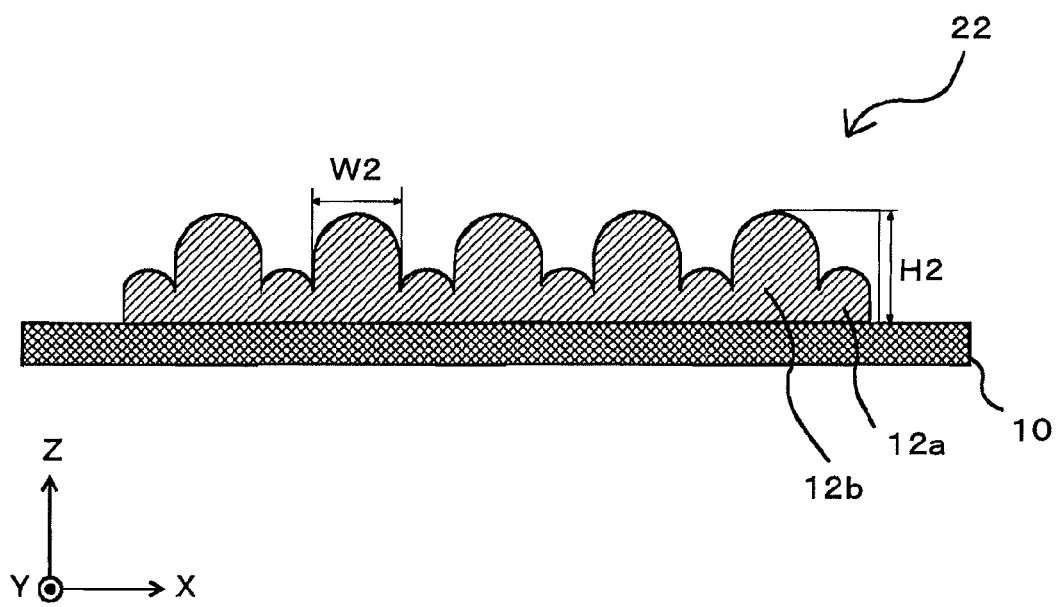
FIG. 3 is a schematic vertical sectional view showing a structure 22 formed at that time when a second linear part 12b is formed between a plural of the first linear parts 12a on the surface of the negative electrode current collector 10 of the structure 20 shown in FIG. 2 (i.e. a structure including the negative electrode current collector 10 and the first linear part 12a and the second linear part 12b made of a negative electrode active material formed on the surface of the negative electrode current collector 10).

FIG. 3 is a schematic vertical sectional view showing a structure 22 formed at that time when a second linear part 12b is formed between a plural of the first linear parts 12a on the surface of the negative electrode current collector 10 of the structure 20 shown in FIG. 2 (i.e. a structure including the negative electrode current collector 10 and the first linear part 12a and the second linear part 12b made of a negative electrode active material formed on the surface of the negative electrode current collector 10).

As shown in FIG. 1, the lithium ion secondary battery 1 according to the embodiment has a structure fabricated by integrating, on the negative electrode current collector 10, the negative electrode active material layer 12 (the first linear part 12a and the second linear part 12b made of the negative electrode active material), a liquid electrolyte layer 14 including a separator 20, and a positive electrode active material layer 16 (the first linear part 16a and the second linear part 16b made of the positive electrode active material) on a positive electrode current collector 18. The negative electrode current collector 10 and the negative electrode active material layer 12 compose the negative electrode, and the positive electrode current collector 18 and the positive electrode active material layer 16 compose the positive electrode. In the explanation, the directions of X axis, Y axis and Z axis of coordinate are defined in the respective Figures.

The negative electrode current collector 10 may be made of known materials used in this technical field and examples thereof may be metal films such as an aluminum foil. The negative electrode current collector 10 may be formed on a surface of an electrically insulating substrate (not shown). The substrate may be a flat plate of an electrically insulating material, and examples thereof include a resin, glass, or ceramics, and the like. Further, the substrate may be a flexible plate.

The negative electrode active material layer 12 is composed of, as shown in FIGS. 1 to 3, a plural of the linear first linear part 12a which elongate in the direction to the Y axis on the negative electrode current collector 10 and a plural of the second linear parts 12b formed between the first linear parts 12a which elongate in the direction to the Y axis. As shown in FIGS. 2 and 3, the height $H_1$ of the first linear part 12a and the height $H_2$ of the second linear part 12b satisfies the following relational inequality (1): $H_1 < H_2$.

Since the second linear part 12b is higher than the first linear part 12a, the negative electrode active material layer 12 having a high aspect ratio can be certainly formed, and thus, an electrode for battery such as a lithium ion secondary battery being excellent in high charge-discharge performance can be certainly obtained.

It is preferable that the height $H_1$ of the first linear part 12a is less than 100 μm and the height $H_2$ of the second linear part 12b is less than 200 μm. According to the construction, since electrical resistances of the first linear part 12a and the second linear part 12b are hard to be higher, there is a merit that the charge-discharge performance does not become worse.

It is also preferable that the width $W_1$ of the first linear part 12a is less than 100 μm and the width $W_2$ of the second linear part 12b is less than 200 μm. According to the construction, since such heights can be gained with respect to the widths of the first linear part 12a and the second linear part 12b, there is a merit that a high aspect ratio can be achieved more certainly.

The negative electrode active material contained in the negative electrode active material layer 12 may be known materials used in this technical field, and examples thereof include metals, metal fibers, carbon materials, oxides, nitrides, silicon, silicon compounds, tin, tin compounds, various metal alloys, and the like. Among them, from viewpoint of large capacity density, preferable are oxides, carbon materials, silicon, silicon compounds, tin, tin compounds, and the like. Examples of the oxides include lithium titanates represented by the formula: $Li_{4/3}Ti_{5/3-x}Fe_xO_4$ ($0 \leq x \leq 0.2$), and the like. Examples of the carbon materials include various natural graphite, cokes, semi-graphitized carbons, carbon fibers, spherical carbons, various artificial graphite, amorphous carbons, and the like. As the silicon compounds, there are silicon-containing alloys, silicon-containing inorganic compounds, silicon-containing organic compounds, solid solutions, and the like. Examples of the silicon compounds include silicon compounds represented by $SiO_a$ ($0.05<a<1.95$); silicon alloys with at least one element selected from Fe, Co, Sb, Bi, Pb, Ni, Cu, Zn, Ge, In, Sn and Ti; silicon; silicon oxides; silicon compounds or silicon alloys where a part of silicon atoms is replaced by at least one element selected from B, Mg, Ni, Ti, Mo, Co, Ca, Cr, Cu, Fe, Mn, Nb, Ta, V, W, Zn, C, N and Sn; and solid solutions thereof. Examples of the tin compounds include $SnO_b$ ($0<b<2$), $SnO_2$, $SnSiO_3$, $Ni_2Sn_4$, $Mg_2Sn$, and the like. The negative electrode active material may be used alone and, occasion demands, may be used in combination of two or more.

The negative electrode active material layer 12 may contain an electrically conductive aid. The electrically conductive aid may be known materials used in this technical field, and examples thereof include graphites such as natural graphite and artificial graphite; carbon blacks such as acetylene black, Ketjen black, channel black, furnace black, lump black and thermal black; electrically conductive fibers such as carbon fibers and metal fibers; fluorinated carbons; metal powders such as aluminum; electrically conductive whiskers such as zinc oxide; electrically conductive metal oxides such as titanium oxide; electrically conductive organic compounds such as phenylene derivatives; and the like. The electrically conductive aids may be used alone and, occasion demands, may be used in combination of two or more.

Particularly as mentioned above, since the first linear part 12a is lower in height and electrical conductivity than the second linear part 12b, it is possible, for instance, to decrease an amount of an electrically conductive aid than that of the second linear part 12b and to increase an amount of the active material, whereby a capacity of the negative electrode active material layer 12 can be enhanced while maintaining its charge-discharge performance.

The lithium ion secondary battery 1 according to the embodiment is fabricated by integrating the positive electrode composed of the positive electrode active material layer 16 and the positive electrode current collector 18 with respect to the negative electrode composed of the negative electrode current collector 10 and the negative electrode active material layer 12, and has the liquid electrolyte layer 14 between the negative electrode and the positive electrode. Accordingly, not shown in the figures, the lithium ion secondary battery 1 according to the embodiment has an air-tight space between the negative electrode and the positive electrode, and the space is charged with an electrolyte.

Namely, as shown in FIG. 1, between the negative electrode active material layer 12 and the positive electrode active material layer 16, the liquid electrolyte layer 14 including the separator 20 is provided.

As the separator 20, there may be used one or more of porous membranes or non-woven fabrics having excellent high discharging performance. Examples of material of the separator 20 include polyolefin resins such as polyethylene and polypropylene; polyester resins such as polyethylene terephthalate and polybutylene terephthalate; vinylidene fluoride-based resins such as poly(vinylidene fluoride), vinylidene fluoride-hexafluoropropylene copolymer, vinylidene fluoride-perfluoro(vinyl ether) copolymer, vinylidene fluoride-tetrafluoroethylene copolymer, vinylidene fluoride-trifluoroethylene copolymer, vinylidene fluoride-fluoroethylene copolymer, vinylidene fluoride-hexafluoroacetone copolymer, vinylidene fluoride-ethylene copolymer, vinylidene fluoride-propylene copolymer, vinylidene fluoride-tetrafluoroethylene-hexafluoropropylene copolymer, vinylidene fluoride-ethylene-tetrafluoroethylene copolymer, and the like.

As the separator 20, there may be used a polymer gel composed of an electrolyte and a polymer such as acrylonitrile, ethylene oxide, propylene oxide, methyl methacrylate, vinyl acetate, vinyl pyrrolidone, or poly(vinylidene fluoride).

The liquid electrolyte layer 14 may be a conventional known electrolyte containing a lithium salt and an organic solvent. Examples of the lithium salt include lithium hexafluorophosphate ($LiPF_6$), lithium perchlorate ($LiClO_4$), and lithium bis(trifluoromethanesulfonyl)imido (LiTFSI), and the like. Examples of the solvent include ethylene carbonate, diethylene carbonate and methyl ethyl carbonate, and a mixture thereof.

On the positive electrode current collector 18, the positive electrode active material layer 16 composed of the first linear part 16a and the second linear part 16b made of the positive electrode active material in the same manner as the negative electrode active material layer 12 on the negative electrode current collector 10.

The positive electrode current collector 18 may be known materials used in this technical field, and examples thereof include metal foils such as copper foil.

Examples of the positive electrode active material (powder) contained in the positive electrode active material layer 16 include lithium-containing composite metal oxides, chalcogen compounds, manganese dioxide, and the like. The lithium-containing composite metal oxide is a metal oxide containing lithium and a transition metal, or a metal oxide where a part of the transition metals of the metal oxide is replaced with a hetero element. Examples of the hetero element include Na, Mg, Sc, Y, Mn, Fe, Co, Ni, Cu, Zn, Al, Cr, Pb, Sb, B, and the like, and preferably are Mn, Al, Co, Ni, Mg, and the like. The hetero element may be single or two or more. Among them, the lithium-containing composite metal oxide is preferably used. The lithium-containing composite metal oxide may be $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (in each chemical formula, M may be at least one selected from Na, Mg, Sc, Y, Mn, Fe, Co, Ni, Cu, Zn, Al, Cr, Pb, Sb, V and B; $0<x\leq1.2$, $0<y\leq0.9$, $2.0\leq z\leq2.3$), $LiMeO_2$ (where Me=MxMyMz; Me and M are transition metal, x+y+z=1), and the like. Examples of the lithium-containing composite metal oxide include $LiNi_{1/3}Mn_{1/3}Co_{1/3}O_2$, $LiNi_{0.8}Co_{0.15}Al_{0.05}O_2$, and the like. Here, in the aforementioned formulae, the value x which represents a molar ratio of lithium varies with charging and discharging. Examples of the chalcogen compounds include titanium disulfide, molybdenum disulfide, and the like. The positive electrode active material may be used alone or in combination of two or more. To the positive electrode active material 16, the aforementioned electrically conductive aids explained in the negative electrode active material layer 12 may be added.

As mentioned above, the lithium ion secondary battery 1 according to the embodiment is composed of the negative electrode current collector 10, the negative electrode active material layer 12, the liquid electrolyte layer 14, the positive electrode active material layer 16 and the positive electrode current collector 18. On a side opposite to the surface contacting to the liquid electrolyte layer 14 of the negative electrode current collector 10 and the positive electrode current collector 18, an insulating substrate may be integrated (not shown). The substrate may be a flat plate of an electrically insulating material, and examples thereof include a resin, glass, or ceramics, and the like. Further, the substrate may be a flexible plate.

The lithium ion secondary battery 1 may have a tab electrode (not shown), and a plural of the lithium ion secondary batteries 1 may connected in series or in parallel to provide a lithium ion secondary battery device.

The lithium ion secondary battery according to the embodiment having those structures is thin and can be bent easily. Since the surface area to volume of the negative electrode active material layer 12 and the positive electrode active material layer 16 is made larger by forming the steric structure in the manner of concavo-convex profile as shown in the drawings, contact areas to each of the negative electrode active material layer 12 and the positive electrode active material layer 16 and the liquid electrolyte layer 14 can be made larger, which results in high efficiency and high power. As explained, the lithium ion secondary battery 1 according to the embodiment is small and has high performance.

The process for preparing the electrode and the lithium ion secondary battery 1 according to the above embodiment is explained herein below. When preparing the lithium ion secondary battery 1 according to the above embodiment, the negative electrode is prepared by forming the negative electrode active material layer 12 on the negative electrode current collector 10, the positive electrode is prepared by forming the positive electrode active material layer 16 on the positive electrode current collector 18, and integrating the negative electrode and the positive electrode in such a manner that the negative electrode active material layer 12 and the positive electrode material layer 16 are positioned face-to-face via the air-tight space and the separator 20, and then charging the space and the separator 20 with the liquid electrolyte to prepare the liquid electrolyte layer 14. In the embodiment, the preparation processes of the negative electrode active material layer 12 and the positive electrode active material layer 16 have characteristic features.

Figure 4:
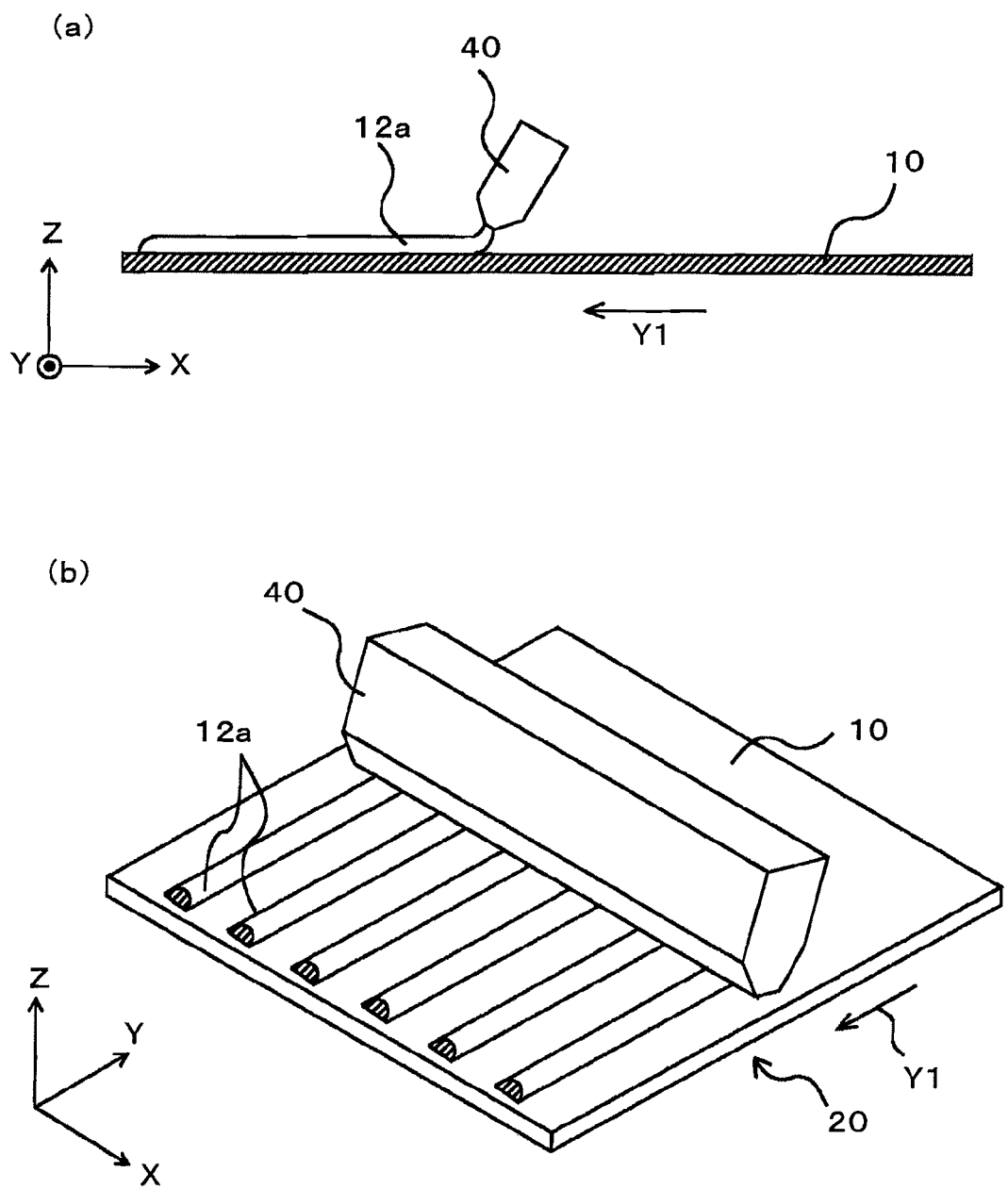
FIG. 4 is a diagrammatic view showing a manner that the first linear 12a is formed by nozzle dispense method according to an embodiment of the present invention.
Figure 5:
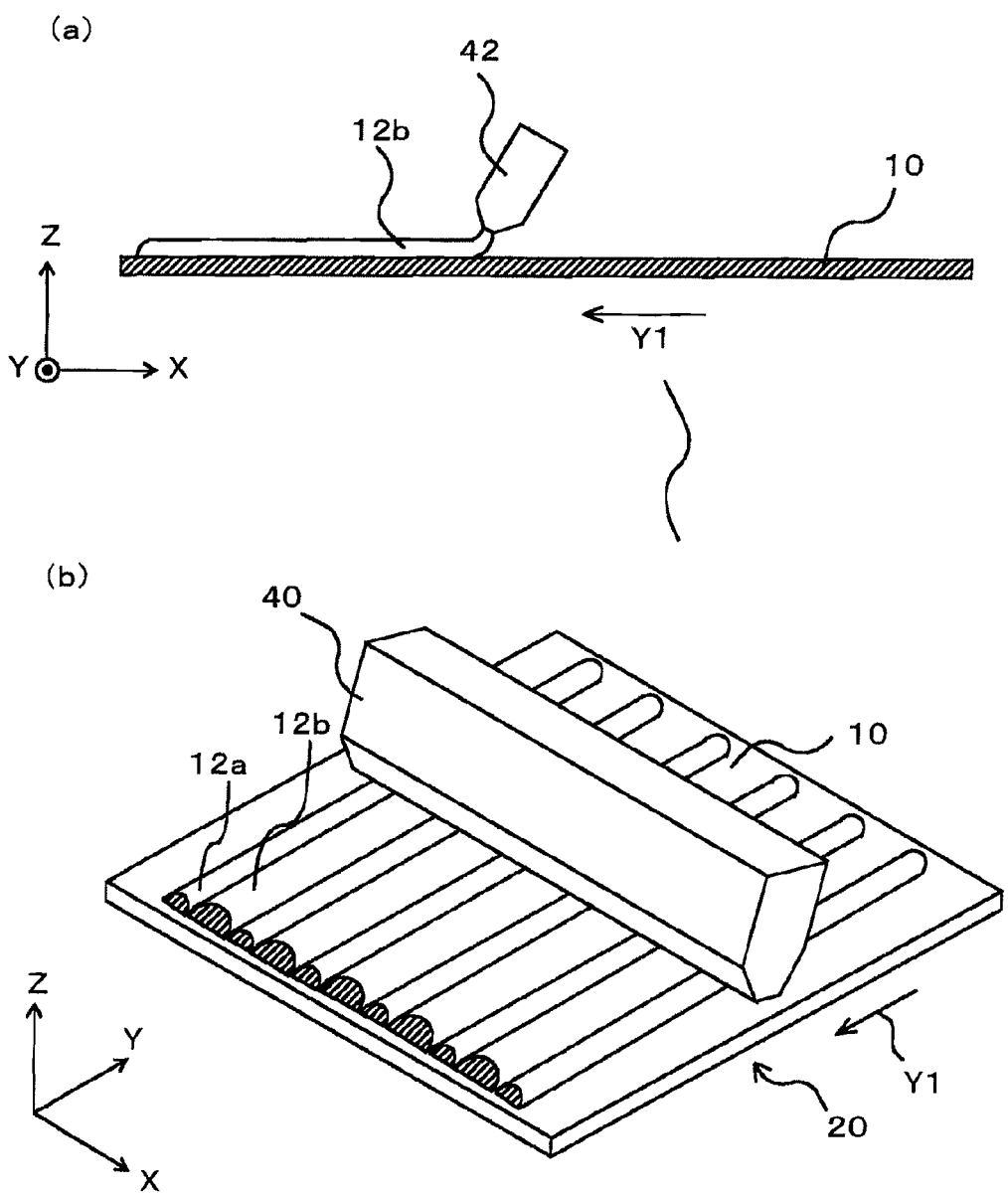
FIG. 5 is a diagrammatic view showing a manner that the second linear part 12b is formed according to an embodiment of the present invention.

The process for preparation of the negative electrode active material layer 12 according to the embodiment is explained herein below. The negative electrode active material layer 12 according to the embodiment can be prepared by the process for preparing the electrode for battery of the present invention including the steps (A) to (D).
(A) A first application step for forming a plural of the first linear parts 12a made of the first negative electrode active material on the negative electrode current collector 10 by relatively moving the first nozzle which discharges the first negative electrode active material linearly with respect to the negative electrode current collector 10,
(B) a first drying step for drying the first linear parts 12a,
(C) a second application step for forming the second linear part 12b made of the second negative electrode active material between the first linear parts 12a on the negative electrode current collector 10 by relatively moving the second nozzle which discharges the second negative electrode active material with respect to the negative electrode current collector 10, and
(D) a second drying step for drying the first linear part 12a and the second linear part 12b.
(A) First Application Step Firstly as shown in FIG. 4, the first nozzle 40 can be moved relative to the negative electrode current collector 10 by transporting the negative electrode current collector 10 in the direction of the allow $Y_1$ by, for example, transporting rollers (not shown). The transporting rollers are so to say scanning means.

Onto the surface of the transporting negative electrode current collector 10, a paste-like first negative electrode active material is discharged from the first nozzle 40 so as to form the first linear part 12a. According to the embodiment, the first nozzle 40 can be moved relatively to the negative electrode current collector 10 by fixing the first nozzle and transporting the negative electrode current collector 10.

The paste-like first negative electrode active material is a mixture prepared by kneading the negative electrode active material, the electrically conductive aid, a binder, a solvent, and the like in the usual manner. A viscosity of the paste-like negative electrode active material can be regulated so as to discharge from the first nozzle 40, and is preferably at least approximately 10 Pa·s, and at most approximately 10000 Pa·s under a shear rate of $1\ s^{-1}$. Any of the components may be dissolved or dispersed in the solvent (including partial dissolution or dispersion).

A solid content of the first negative electrode active material used in the first application step for forming the first negative electrode active material layer can be regulated so as to discharge from the first nozzle 40, and is a solid content smaller than a solid content at its wetting point of the mixture, for example 60% by mass.

The viscosity and solid content are varied with kinds and proportions of the negative electrode active material, electrically conductive aid, binder, solvent, and a desired size and shape, and can be regulated by a period of time of kneading when the negative electrode active material, electrically conductive aid, binder, and solvent are kneaded in the usual manner.

The binder may be known materials used in this technical field, and examples thereof include poly(vinylidene fluoride) (PVDF), polytetrafluoroethylene (PTFE), polyethylene, polypropylene, aramid resin, polyamide, polyimide, polyamideimide, polyacrylonitrile, poly(acrylic acid), poly(methyl acrylate), poly(ethyl acrylate), poly(hexyl acrylate), poly (methacrylic acid), poly(methyl methacrylate), poly(ethyl methacrylate), poly(hexyl methacrylate), poly(vinyl acetate), poly(vinyl pyrrolidone), polyether, polyethersulfone, polyhexafluoropropylene, styrene-butadiene rubber, ethylene-propylene diene copolymer, carboxymethylcellulose, and the like. In addition, there may be used, as the binder, copolymers of monomers selected from tetrafluoroethylene, hexafluoropropylene, perfluoro(alkyl vinyl ether), vinylidene fluoride, chlorotrifluoroethylene, ethylene, propylene, pentafluoropropylene, fluoromethyl vinyl ether, acrylic acid, hexadiene, and the like. The binder may be used alone and, occasion demands, may be used in combination of two or more.

The solvent is preferably an organic solvent expecting water on order to avoid decomposition of hexafluorophosphate ($LiPF_6$) and the like which compose the solid electrolyte layer 14. The solvent may be known solvents used in this technical field, and examples thereof include dimethylformamide, dimethylacetoamide, methylformamide, N-methyl-2-pyrrolidone (NMP), dimethylamine, acetone, cyclohexane, and the like. The solvent may be used alone and, occasion demands, may be used in combination of two or more.

FIG. 4($a$) is a diagrammatic side view to show the manner that the first linear part 12$a$ which composes the negative electrode active material layer 12 (that is, a view in the direction being parallel to the main surface of the transporting negative electrode current collector 10). FIG. 4($b$) is a diagrammatic perspective view to show the manner that the first linear part 12$a$ which composes the negative electrode active material layer 12.

According to the nozzle dispense method, providing the first nozzle 40 which has a plural of discharging nozzles to discharge the coating liquid of the negative electrode active material above the negative electrode current collector 10, the negative electrode current collector 10 is moved in relative to the first nozzle 40 in the direction of the allow $Y^1$ at a constant speed, while discharging a given amount of the negative electrode active material. As a result, on the negative electrode current collector 10, a plural of the first linear parts 12$a$ made of the first negative electrode active material are applied and formed along with the direction of Y in such a pattern as stripe.

When providing a plural of the discharging nozzles with the first nozzle 40, a plural of the first linear parts 12$a$ are formed in the pattern of stripe, and when continuing the transportation of the negative electrode current collector 10, the stripe-like first linear parts 12$a$ can be formed all over the surface of the negative electrode current collector 10.

(B) First Drying Step

A plural of the first linear parts 12$a$ of the first negative electrode active material prepared as above are green films containing the solvent. Therefore, the negative electrode current collector 10 where the first linear parts 12$a$ are provided thereon may be transported so as to pass through the downstream region with a drying means such as a blower, and may be subjected to the first drying step by a dry air. Through the first drying step, the structure 20 shown in FIG. 2 (a structure including the negative electrode current collector 10, the first linear part made of the first negative electrode active material formed on the surface of the negative electrode current collector 10).

A drying temperature in the first drying step may be a temperature range so as to dry and fix the first part 12$a$ temporally, and preferably within a range of 5 to 150°, more preferably a normal temperature (23°) to 80°. The period of drying in the first drying step can be controlled by regulating the transporting speed of the negative electrode current collector 10.

(C) Second Application Step

Next, the second linear part 12$b$ made of the second negative electrode active material is formed between the first linear parts 12$a$ on the negative electrode current collector 10 by relatively moving the second nozzle which discharges the second negative electrode active material with respect to the negative electrode current collector 10.

In the second application step, in the same manner as the first application step shown in FIG. 4, the second linear part 12$b$ is formed between the first linear parts 12$a$ by moving relatively the negative electrode current collector 10 provided thereon the first linear parts 12$a$ with respect to the second nozzle 42.

In the embodiment, as the second negative electrode active material there is used the same material as that of the first negative electrode active material, and as the second nozzle 42 there is used a nozzle having a wider opening (discharging opening) in the direction of X, and the moving speeds of the second nozzle 42 and the first nozzle 40 relative to the negative electrode current collector 10 and the positive electrode current collector 18 are the same.

As a result, the structure 22 (i.e. a structure including the negative electrode current collector 10 and the first linear part 12$a$ made of the first negative electrode active material and the second linear part 12$b$ formed on the surface of the negative electrode current collector 10) can be obtained, and which can satisfy the aforementioned relational inequality (1): $H_1<H_2$ ($H_1$ is the height of the first linear part 12$a$ and $H_2$ is the height of the second linear part 12$b$).

In order to satisfy the relational inequality (2): $W_1 \leq W_2$, ($W_1$ is the width of the first linear part 12$a$ and $W_2$ is the width of the second linear part 12$b$), the relative movement speed may be controlled. When satisfying the relational inequality of $W_1=W_2$, the second nozzle 42 may be the same as the first nozzle 40.

Though, in the above, there is explained the case that the first nozzle 40 is also used as the second nozzle 42, the second nozzle which is the same as the first nozzle may be used. In this case, in order to form the first linear part and the second linear part which satisfy the relational inequality (1), and further the relational inequality (2), the shape and/or the size of the first nozzle and the second nozzle may be varied.

(D) Second Drying Step

After the second application step, the structure 22 including the first linear part 12$a$ made of the first negative electrode active material and the second linear part 12$b$ formed on the surface of the negative electrode current collector 10 is subjected to the second drying step.

In the second drying step, the first linear part 12$a$ dried in the first drying step is also completely dried so as that the solid content is approximately 100% by mass by evaporating the solvent together with the second linear part 12$b$. To achieve the drying, the structure 22 is transported into a heating dry oven, and the second drying step is carried out at a temperature higher than the drying temperature in the first drying step.

The formation of the positive electrode active material layer 16 on the positive electrode current collector 18 is also conducted in the same manner as in the formation of the negative electrode active material layer 12 on the negative electrode current collector 10. By integrating the thus prepared negative electrode and the positive electrode in such a manner that the negative electrode active material layer 12 and the positive electrode material layer 16 are positioned face-to-face via the air-tight space and the separator 20, and then charging the space and the separator 20 with the liquid electrolyte to prepare the liquid electrolyte layer 14. Thereby the lithium ion secondary battery 1 of the embodiment can be obtained.

<Modifications>

In the above, there is explained one embodiment of the present invention, but the present invention is not limited to the embodiment. For example, though in the explanation the preparation process of the present invention is applied to both of the preparations of the negative electrode active material layer 12 composed of the first linear part 12$a$ and the second linear part 12$b$, and the positive electrode active material layer 16 composed of the first linear part 16$a$ and the second linear part 16$b$, the preparation process of the present invention may be applied to the preparation of either the negative electrode active material layer or the positive electrode active material layer by the first linear part and the second linear part.

The composition of the second active material may be different from that of the first active material. It is also be possible to discharge the first active material and the second active material with the same nozzle. In such a case, the regulation of the height and/or width of the first linear part and the second linear part can be optionally done by controlling the relative moving speed of the nozzle with respect to the current collector and the discharging amount of the first active material and the second active material.

In the preparation process of the electrode according to the aforementioned embodiment, though the first drying step after the first application step is carried out by blowing, the drying step may be carried out by natural drying or under vacuum.

As shown in FIG. 1, though there is explained the embodiment that in the negative electrode active material layer 12, the first linear part 12a is contact with the second linear part 12b (in the positive electrode active material layer 16, the first linear part 16a is contact with the second linear part 16b), there may exist spaces between the first linear part 12a and the second linear part 12b, and the first linear part 16a and the second linear part 16b. In such a case, the liquid electrolyte enters into the spaces.

According to the aforementioned embodiment, since the nozzle dispense method is employed for forming the negative electrode active material layer and the positive electrode active material layer which should have the convexo-concave patterns, various patters can be formed within a short period of time. Further, a fine pattern can be formed suitably by the nozzle dispense method. According to the process of the present invention, only the formation of fine pattern is required in the first application step, namely, the application step of the liquid active material, and thus the formation of fine pattern is not required in the following steps because in the following application steps it is sufficient to apply uniformly.

The present invention is not limited to the embodiments mentioned above, any modifications can be employed if it is suitable to those steps. For example, the application method is not limited to the aforementioned method in each step, and any other application step may be employed if it is suitable to those steps. Moreover, for example, the liquid electrolyte layer 14 may be replaced with a solid electrolyte layer. In such a case, the solid electrolyte layer may be formed by applying a solid electrolyte material by spin coating method or splay coating method.

What is claimed is:

1. A process for preparing an electrode for battery, comprising
    a first application step for forming a first linear part by relatively moving a first nozzle which discharges a first active material linearly with respect to a current collector to form a plural of first linear parts on the current collector,
    a first drying step for drying the first linear parts,
    a second application step for forming a second linear part between the first linear parts by relatively moving a second nozzle which discharges a second active material with respect to the current collector, and
    a second drying step for drying the first linear part and the second linear part,
    wherein a height $H_1$ of the first linear part and a height $H_2$ of the second linear part satisfies the following relational inequality (1): $H_1 < H_2$.

2. The process for preparing an electrode for battery of claim 1, wherein the first active material and the second active material are the same.

3. The process for preparing an electrode for battery of claim 1, wherein a width $W_1$ of the first linear part and a width $W_2$ of the second linear part satisfies the following relational inequality (2): $W_1 \leq W_2$.

4. The process for preparing an electrode for battery of claim 3, wherein the width $W_1$ less than 100 μm and the width $W_2$ is less than 200 μm.

5. The process for preparing an electrode for battery of claim 1, wherein the height $H_1$ is less than 100 μm and the height $H_2$ is less than 200 μm.

* * * * *